United States Patent [19]
Ellis

[11] 3,936,148
[45] Feb. 3, 1976

[54] HEAD-UP DISPLAY UNITS AND OPTICAL DEVICES

[76] Inventor: Stafford Malcolm Ellis, Ribblesdale, Ashford Road, Bearsted Maidstone, Kent, England

[22] Filed: May 31, 1974

[21] Appl. No.: 475,107

[30] Foreign Application Priority Data
May 31, 1973 United Kingdom............... 25902/73
July 7, 1973 United Kingdom............... 32478/73
Nov. 3, 1973 United Kingdom............... 51134/73
Nov. 28, 1973 United Kingdom............... 55163/73

[52] U.S. Cl. ......... 350/173; 178/7.85; 178/DIG. 20; 340/27 NA; 350/174; 350/286; 350/301; 353/12
[51] Int. Cl.² ..................... G02B 5/04; G02B 27/10
[58] Field of Search ........... 350/169, 173, 174, 301, 350/286, 287, 52; 353/12–14, 28, 30; 356/251, 252; 340/27 NA; 178/7.85, 7.88, DIG. 20

[56] References Cited
UNITED STATES PATENTS
3,737,212 6/1973 Antonson et al. .................. 350/174
3,814,496 6/1974 Mukai............................. 350/287 X

*Primary Examiner*—Siegfried H. Grimm
*Attorney, Agent, or Firm*—Brisebois & Kruger

[57] ABSTRACT

A head-up display unit for use for example in an aircraft has (*a*) a porthole part of a source of collimated luminous signals disposed directly in the field of view of an observer when looking at a scene ahead of him from an observation position thus obscuring part of his view and (*b*) a combining optical system disposed adjacent the porthole part and having plane optical surfaces which transmit to the observer's eyes light from the porthole directly, and light from the scene ahead by reflection, whereby the observer sees in superposed relationship the scene ahead and a display of collimated luminous signals. In a preferred arrangement the plane optical faces are constituted by plane boundary faces of prisms cemented together to form a stable assembly.

39 Claims, 14 Drawing Figures

CATHODE RAY TUBE SCREEN (20° CONE ANGLE)

HEAD-UP DISPLAY UNITS AND OPTICAL DEVICES

This invention relates to visual observation means for enabling a person (conveniently referred to hereafter as "the observer") enclosed within a vehicle, such as an aircraft or tank, or some other enclosure to observe a scene outside and at the same time to see in superposition upon that scene information presented for his observation and use. Such information may provide the observer with, for example, instructions or guidance as to some desired course of action or objective to be achieved.

Thus, for example, in an aircraft a pilot may wish to have within his normal field of view the ever-changing scene ahead of the aircraft and at the same time information concerning the present or future operation of the aircraft. This is possible with a socalled 'head-up display system' (commonly abbreviated to 'HUD system'). In conventional present day HUD systems data is represented by luminous signals (characters, lines etc) produced on a relatively dark screen (e.g. of a cathode ray tube), and an optical system is used to collimate the luminous signals and to project them through an output aperture or porthole, on to a transparent plane screen through which the pilot observes the scene ahead of the aircraft when seated normally in the aircraft.

Thus the pilot sees ahead of him, in addition to the external scene, reflections of the luminous signals, which reflections are made to appear as if at an infinite distance in front of him. The transparent screen (referred to hereafter as the "combiner screen') is inclined to the normal line of sight of the pilot, when seated normally and viewing the scene ahead of the aircraft, so that the dark screen (i.e. the luminous signal source) on which the luminous signals are produced and the collimating optical system (later referred to collectively as the collimated signal source) may be positioned in some convenient position where it will not obscure the pilot's normal and direct view of the scene ahead of the aircraft.

In the past the most convenient position for the collimated signal source has been below the pilot's normal line of sight, so that the apparatus constituting that source (including for example a cathode ray tube as the luminous signal source) has necessarily taken up valuable instrument panel space, thus reducing the space available for other necessary instrumentation.

In such conventional present day systems the collimated signal source has its output aperture or porthole necessarily spaced some distance from the observer (because of other constraints, e.g. the need for an obstructed pilot ejection path) so that for a given size of porthole the area of that screen that can be seen simultaneously (i.e. instantaneously) by the pilot is dependent on the length of the light path between the porthole and the eyes of the pilot. The greater this light path length, the smaller is the pilot's instantaneous area or field of view of what lies behind the porthole. Thus the pilot has to move his eyes about in order to see all the luminous signals on the screen of the cathode ray tube.

With the large light path lengths currently used in modern aircraft, the porthole size has become very large in the interests of giving the pilot a good instantaneous field of view of the information displayed on the screen, whereby to reduce the amount of eye movement that is necessary for full vision of the screen. Hence head-up display units have become very bulky and heavy.

It is, however, the case that even with the presently available maximum size of porthole diameter the pilot's instantaneous field of view of the cathode ray tube screen is still undesirably restricted. In some systems mechanisms have been provided for temporarily adjusting the position of the combiner screen so as to temporarily vary the pilot's instantaneous field of view of the cathode ray tube screen, and this mechanism offers further to the bulk and weight of the display unit.

Conventional present day HUD systems also suffer from the undesirable occurrence on the combiner screen of bright spots which can dazzle and disturb the pilot and which originate from light rays from the sun.

Thus summarising briefly before proceeding further, prior art head-up-display systems have allowed the pilot of an aircraft to see the scene ahead of the aircraft by direct visual observation, through the normal windshield of the aircraft cockpit and an inclined transparent combiner screen, and information in the form of luminous signals has been transmitted to him by reflection on the combiner screen of a source of collimated luminous signals disposed below the pilot's field of view through the windshield.

Attempts have been made to provide the pilot with reflections of such a luminous signal source disposed elsewhere in the cockpit. In particular to the UK Pat. Specifications NO. 999,840 and 1,223,173, the luminous signal source has been placed behind the pilot and the pilot has been provided with a reflecting optical system (to be worn in the manner of spectacles) to enable him to see superposed upon the scene ahead of the luminous signals of the source behind him.

In the earlier of the two prior specifications, a wide angle of view of the collimated signal source is required, and it is stated on page 3 at lines 118 to 126 that such a source, because of its sheer size, is difficult to mount in a position related to the windshield. Hence the disposition of that source behind the pilot, and away from the normal instrument panels beneath the windscreen.

In the later of the two prior specifications it is recited on page 1 at lines 37 to 58, that the minimum acceptable distance of the pilot's eyes from the optical system limits the pilot's field of view of information, and hence restricts the total amount of information which can be effectively displayed simultaneously to him.

Thus it is an object of the present invention to provide as a visual observation means a head-up display system in which a novel disposition of the various components enables the effective distance between the collimated signal source and the eye of the pilot (or other observer) to be greatly reduced, thus enabling a greater display of luminous information to be presented to the observer at any instant.

According to the present invention a head-up display unit for use for example in an aircraft includes a source of luminous signals, a collimating optical unit having a part defining an input aperture disposed adjacent the luminous signal source and a part defining an output aperture or porthole through which a virtual image of the luminous signal source is visible, which image subtends at the eye at an observer when looking at the porthole from a predetermined eye position a predetermined angle that is greater than the angle subtended by the porthole at the observer's eye, and means for combining a view of the porthole with a view of a scene lying ahead of the observer when at an observation position whereby the observer may perceive in superposed relationship the said scene and luminous signals produced by the said source, and is characterised in that at least the porthole part of the collimating optical unit is disposed between the said observation position and the said scene ahead of the observer whereby part of the observer's view of that scene by direct vision is obscured, and that the combining means is disposed between the porthole part of the collimating optical unit and the said observation position, and comprises means for transmitting to the observer's eye a view of the porthole by direct transmission of light from the porthole and a view of the said scene ahead by reflection of light from the said scene.

With such an arrangement it is possible to substantially reduce the length of the light path between the observer's eye and the porthole, so that the observer's instantaneous field of view of what lies beyond the porthole can be substantially increased.

In a preferred form of head-up display unit the combining means includes two mutually-inclined plane optical faces (referred to hereafter as the inner optical faces) which adjoin one another at a common edge disposed remote from the said porthole part, which inner optical faces diverge in the direction of and jointly span the said porthole part, and two further plane optical faces (referred to hereafter as the outer optical faces) which are disposed substantially parallel with and spaced from the respective inner optical faces, the inner optical faces being capable of transmitting light from the porthole to an observer at the observation position and of reflecting to the observer light received from the scene ahead by virtue of reflection at the outer optical faces.

An advantageous arrangement is obtained when the said common edge of the inner optical faces is positioned centrally relative to the part of the collimating optical unit which obscures the observer's direct vision of the scene ahead;

the inclination and length of each inner optical face, and the inclination and spacing of each outer optical face relative to the adjacent inner optical face, are determined by the path of a predetermined boundary ray of light which passes from a predetermined extremity of the scene adhead on one side thereof and which is seen by an observer's eye positioned at a predetermined limiting eye position on the opposite side of a central plane which passes through the said common edge of the inner optical faces and through the centre of the said porthole part and of the scene ahead, after reflection at the respective edges of the inner and outer optical faces which lie nearest the said porthole part on the same side of the central plane of the said extremity; and the length of each outer optical face being determined by the path of a limiting ray of light from the scene ahead, which ray skirts the said vision-obscuring part of the collimating optical unit on the same side of the central plane as the said predetermined limiting eye position, and which is seen by the observer's eye at that position after reflection at the respective edges of the outer and inner optical faces which lie furthest from the said porthole part on the same side of the central plane as the said limiting eye position.

According to another preferred feature of the present invention inner and outer optical faces which lie adjacent one another are constituted by opposite, substantially parallel faces of a glass prism, and a third glass prism of triangular shape has two similar plane faces cemented to the respective faces of the respective prisms which consitute the said inner optical faces, the cemented pairs of faces of the third prism being such as to provide the aforesaid light transmitting and reflecting properties, and the three prisms being of a glass material having predetermined optical properties.

In a preferred arrangement the two similar faces of the central triangular prism are treated before being cemented to adjacent faces of adjacent prisms so as to render them capable of transmitting light from the porthole and of reflecting light from the adjacent outer optical face, and each of the said adjacent faces of the said adjacent prisms is similarly treated as aforesaid only at a central area, and is treated at boundary areas adjoining the central arm so as to render the boundary areas only capable of reflecting light from the adjacent outer optical face.

Preferably in the assembly of prisms the inner and outer optical faces terminate at plane transverse faces which diverge in the direction of the porthole.

The input aperture of the collimating optical unit may be coaxial with the output aperture or porthole. Alternatively, the input aperture of the collimating optical unit may be offset relative to the output aperture or porthole, in which case the collimating optical unit includes means for reflecting rays of light from the luminous signal source to the porthole whereby to render luminous signals of the said source visible through the porthole.

The collimating optical unit may have a second input aperture disposed adjacent a second luminous signal source, in which case the collimating optical unit includes means for combining rays of light from the respective luminous signal sources whereby to render luminous signals from both sources visible simultaneously through the porthole.

The, or at least one, luminous signal source may include electrical energisation means responsive to electrical input signals supplied thereto whereby to provide a luminous signal display which varies in accordance with the input signals. Such a source may comprise a cathode ray tube. Furthermore, or at least one, luminous signal source may comprise means for producing a static display of luminous signals.

In a preferred arrangement an output lens mounted at the porthole comprises a lens in the shape of a circle from which opposite edge parts have removed to provide a pair of parallel boundaries.

One head-up display unit (and various modified forms thereof) for an electrically-operated head-up display system according to the present invention will now be described by way of example and with reference to the accompanying diagrammatic drawings, in which.

Figure 1:
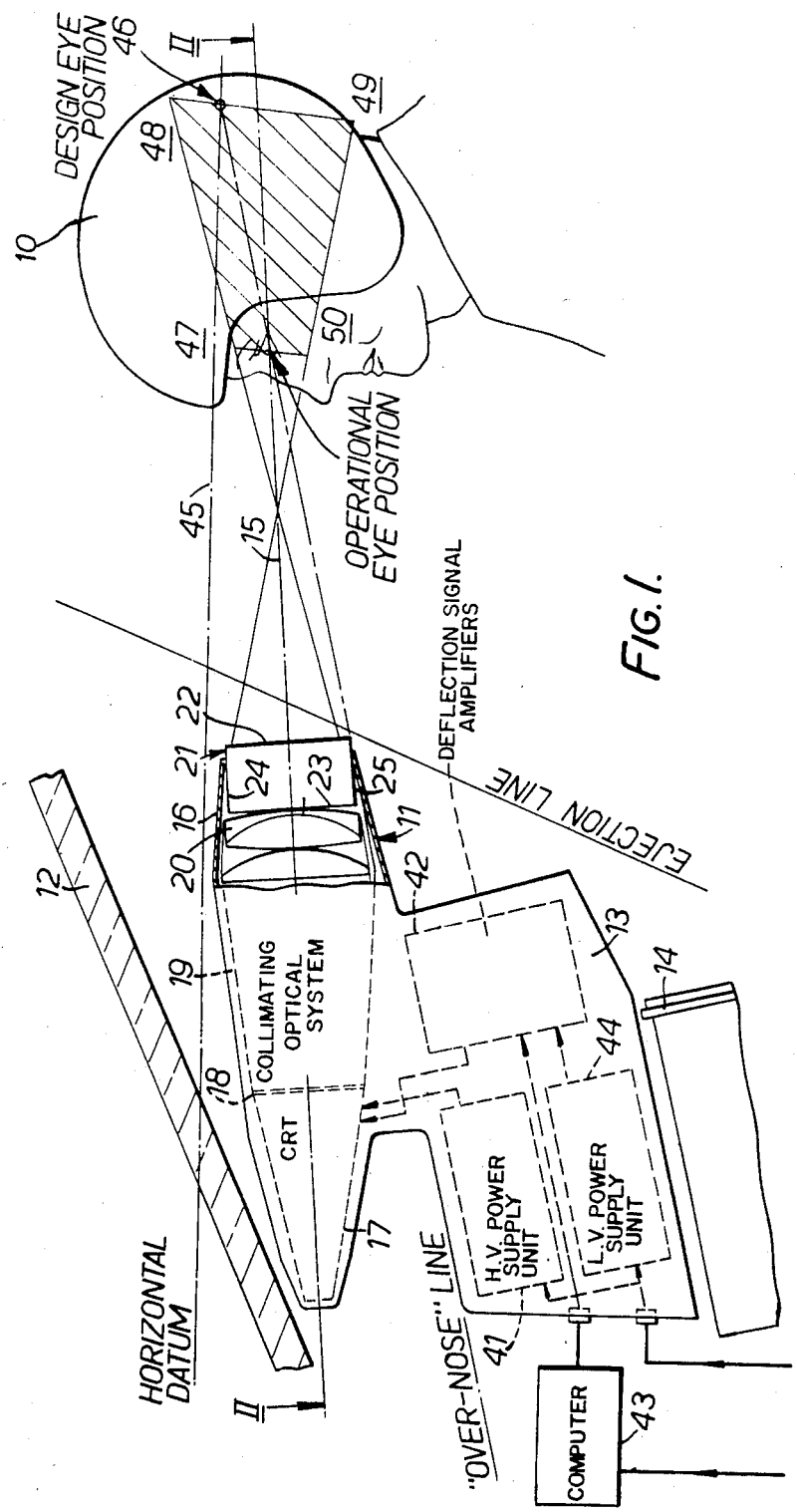
FIG. 1 shows diagrammatically a partly sectional side view of the display unit mounted in an aircraft cockpit for use by a pilot of the aircraft.
Figure 2:
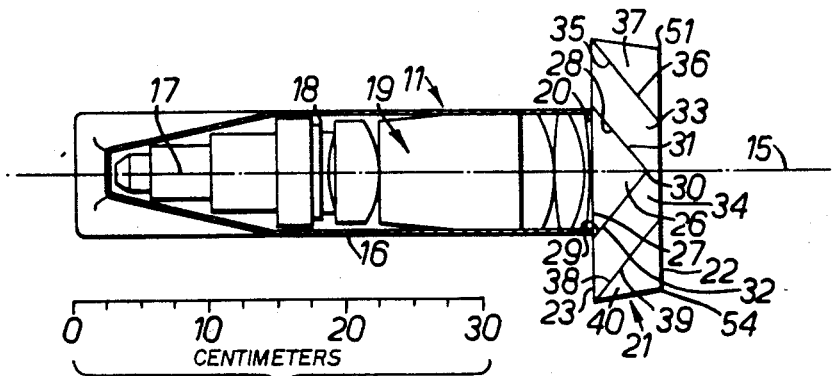
FIG. 2 shows diagrammatically a longitudinal sectional view looking downwards on the section II—II of FIG. 1.
Figure 3:
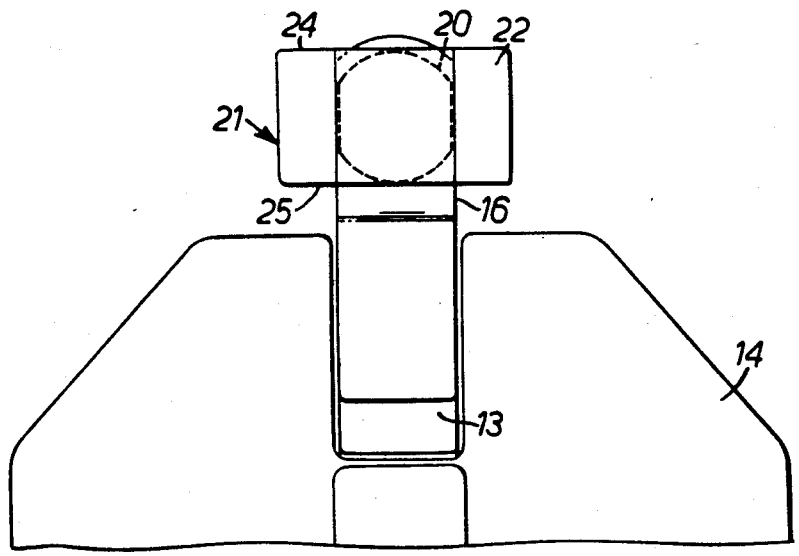
FIG. 3 shows a rear view of the display unit as seen from the right in FIG. 1.

Referring now to the FIGS. 1 to 3, a pilot 10 seated normally in an aircraft cockpit views the scene ahead of the aircraft over the aircraft nose through a head-up display unit 11 which is mounted between the pilot's head and the forward wind-shield 12 of the cockpit. The display unit has a lower mounting part 13 by means of which the unit is carried centrally in a space provided in the upper part of the pilot's forward instrument panel 14.

The display unit has a longitudinal optical axis 15 which extends to the pilot's eye when the pilot's head is in the "operational eye" position shown.

Within an outer casing 16, the display unit includes a linear arrangement of components, aligned along the longitudinal optical axis 15. At the forward end (i.e. relative to the aircraft) is disposed a cathode ray tube 17 having adjacent its rearwardly-facing screen 18 a collimating optical system 19. The casing has at its rearward end a porthole 20 through which collimated luminous signals may be observed. Disposed across and covering the porthole 20 is a horizontally-arranged transverse composite prism assembly 21, the rear face of which is presented directly to the pilot's view.

The prism assembly 21 has rear and forward faces 22, 23 which are plane and parallel with one another, and upper and lower faces 24, 25 which are plane and parallel to one another, and normal to the rear end forward faces 22, 23. The assembly comprises a plurality of glass prisms which are cemented together in such a manner that the inter-faces between adjacent prisms constitute plane optical faces which are capable of simultaneously transmitting and reflecting light rays in a manner that will be apparent from what follows. The various prisms all have the same glass composition and hence the same optical properties.

As best shown in FIG. 2 the prism assembly includes a central prism 26 of triangular transverse cross section, which prism has a free plane face 27 which spans the porthole 20 and second and third plane faces 28, 29 which meet at the rear vertical edge 30 and which are cemented to adjacent plane faces 31, 32 of two similar but complementary intermediate prisms 33, 34.

The intermediate prism 33 has a further plane face 35 which is parallel to the plane face 31 and which is cemented to a corresponding plane face 36 of an outer prism 37 of triangular transverse cross-section.

Likewise, the intermediate prism 34 has a further plane face 38 which is parallel to the plane face 32 and which is cemented to a corresponding plane face 39 of an outer prism 40 of triangular transverse cross section.

The intermediate prisms 33, 34 are cemented to one another along narrow, vertical plane faces which meet one another adjacent the rear edge 30 of the central prism 26.

The cathode ray tube 17 is connected with a high voltage power supply unit 41, and with an amplifier unit 42 which supplies X and Y deflection signals to the respective deflection systems of the tube. The amplifier unit is in turn fed with appropriate electrical signals by a computing apparatus 43 which has input circuits for receiving input signals from which it is to compute data to be displayed by the cathode ray tube 17 at the porthole 20. The high and low voltage power supply units 41 and 44 have an input circuit for receiving electric power from a supply source.

In operation, luminous signals produced at the porthole 20 of the collimating optical system 19 will, when of appropriately high intensity, be observed by the pilot through the partially light-transmitting, inclined, plane interfaces 28, 31 and 29, 32 of the prisms 26, 33, 34. These signals will appear as if at an infinite distance. However, the pilot will not see the darker parts of the cathode ray tube screen through the porthole. Instead the pilot will see on the partially light-reflecting, inclined, plane interfaces 28, 31 and 29, 32 of the prisms 26, 33, 34 an image of the scene ahead of the aircraft, as would be seen by the pilot if the pilot's forward view were not obstructed by the cathode ray tube 17 and collimating optical system 19. How this is achieved will be explained later.

The prism assembly is designed so that the pilot cannot see the side surfaces of the display unit casing 16, or of the aircraft nose, so long as he does not move his head outside a predetermined 3-dimensional zone of permitted head motion. This zone can be made large enough to encompass all normal head positions of the pilot when performing the task of piloting the aircraft.

It will be noted that the longitudinal optical axis 15 is inclined downwardly from a horizontal datum, as represented by the chain-dotted line 45, so as to be aligned with the normal direction of vision required by the pilot when he is performing a task (such as landing or following an aerial target) demanding his concentration and an unobstructed view just over the aircraft nose.

When the pilot is performing some less demanding task, such as when flying in level flight condition under auto-pilot control, the pilot's hand will normally occupy a more relaxed position to the rear of and slightly higher than that indicated. In this case the pilot's eye will occupy a so-called "design eye position" indicated at 46 instead of the so-called operational eye position shown in the FIG. 1. In the design eye position the pilot may observe the scene ahead alternatively through the HUD display unit 11, or when a more distant view is required by looking over that unit.

A shaded quadrilateral defined by the points 47 to 50 in FIG. 1 indicates the zone of eye positions in which effective uninterrupted vision through the display unit can be achieved, the upper boundary of the quadrilateral setting the limit for eye positions disposed higher than the design and operational eye positions, and the lower boundary of the quadrilateral setting the limit for eye positions disposed lower than the design and operational positions.

Figure 4:
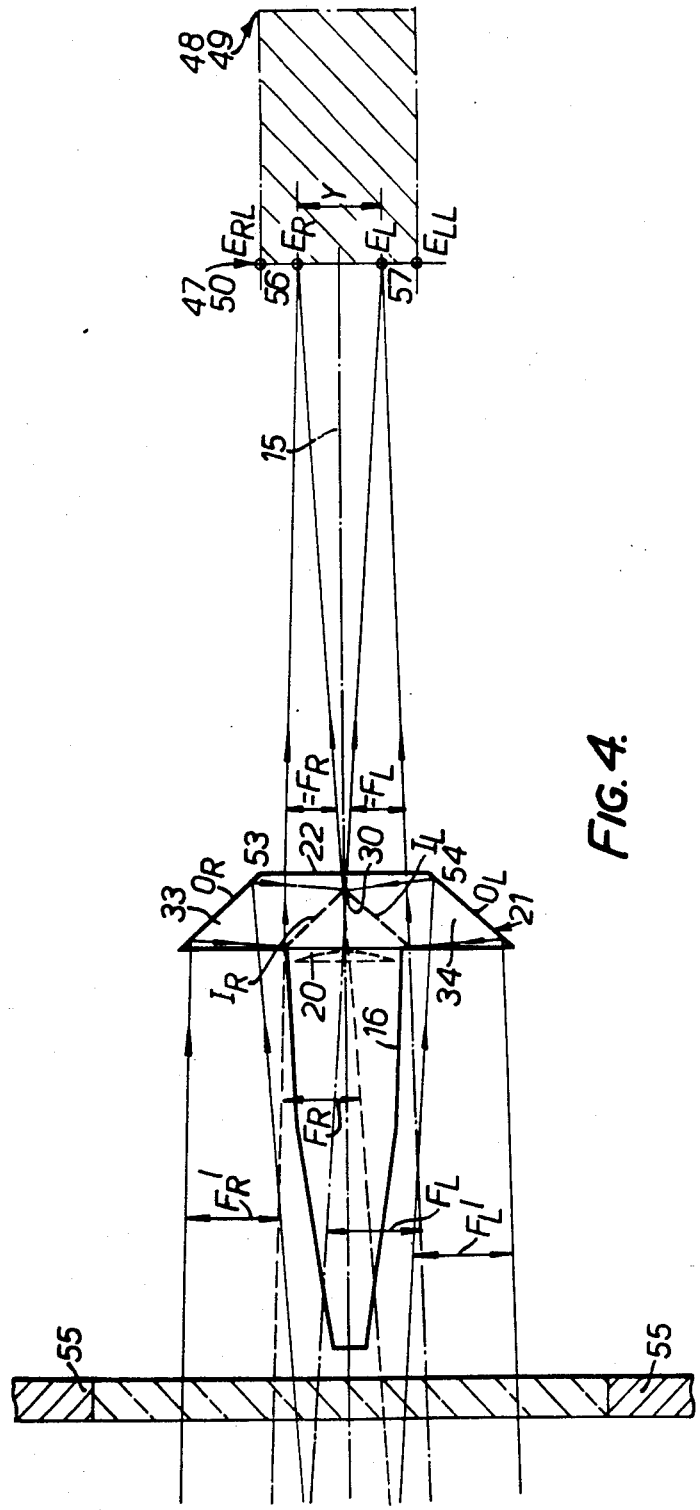
FIG. 4 shows a simplified diagrammatic plan view of a first modified form of the display unit shown in the FIGS. 1 to 3, in which view the paths of various light rays passing to the pilot's eyes are shown.

The modified display unit shown in FIG. 4 is generally similar to that shown in and described with reference to the FIGS. 1 to 3, through the assembly of prisms does not include the outer triangular prism 37 and 40, and the outer plane faces 35 and 38 are made totally reflecting instead. Thus whereas in the unit of FIGS. 1 to 3, the pilot could see the scene ahead through a rearward viewing face extending from corner 51 to corner 52 of the prism assembly, in the unit of FIG. 4 the rearward face extends only from the corner 53 to the corner 54. However, the unit of FIG. 4 is generally preferred since all the light rays from the scene ahead are reflected twice and hence suffer equal losses, whereas in the unit of FIGS. 1 to 3 light rays transmitted directly through the outer triangular prisms 37 and 40 without deflection suffer losses which are different from those suffered by the same light rays when reflected twice before reaching the observer's eyes. Hence, unless very great care is exercised in the design of the prism assembly, the scene ahead as viewed through the optical system of FIGS. 1 to 3 may undesirably exhibit successive vertical bands of different average light intensities.

In FIG. 4 the constraints placed upon the pilot's forward field of view by the windshield frame 55 are indicated. The normal 'operational eye' positions are shown at 56, 57, separated by a typical inter-pupillary distance Y.

In the display units shown in the FIGS. 1 to 3 and in FIG. 4, the rear edge 30 of the central prism 26 lies forward of the rear face 22 of the assembly. However, in some circumstances the design of the prism assembly is such that the rear edge 30 lies in the plane of the rear face 22 of the assembly. Such an arrangement is shown in the modified form of display unit shown in FIG. 7. This arrangement is achieved by reducing the angle between the partly transmissive-partly reflective faces 28, 29 of the triangular prism 26 to a value below 90°. This modified form of display unit also has the feature that the forward plane faces 58, 59 of the outer prisms 33, 34 lie forward of the forward free plane face 27 of the central prism 26, so that a forward part 60, 61 of each of the outer prisms lies alongside the rear part of the housing 16.

The display units so far described may be modified so as to accommodate an additional luminous source for providing in the porthole 20 a second set of luminous data signals, preferably displayed in a distinctive colour. This may be achieved by incorporating in the collimating optical system a prism assembly comprising two triangular prisms cemented together to define at the interface of the two prisms a partially-reflective/partially-transmissive plane optical face which is inclined to the longitudinal optical axis 15. This inclined face is arranged to transmit the signals of the first cathode ray tube 17 without deflection to the porthole 20, and at the same time to reflect to the porthole 20 luminous signals produced on the screen of a second cathode ray tube which is disposed below the inclined face and which is appropriately inclined to the longitudinal optical axis 15.

By providing at the inclined interface of these two prisms a dichroic layer or film, the luminous signal display seen at the porthole can comprise for example a display of green signals provided by the first cathode ray tube 17 and a superposed display of red signals provided by the second cathode ray tube. In this case the dichroic layer transmits signals in the green part of the colour spectrum and reflects signals in the red part of that spectrum.

Figure 8:
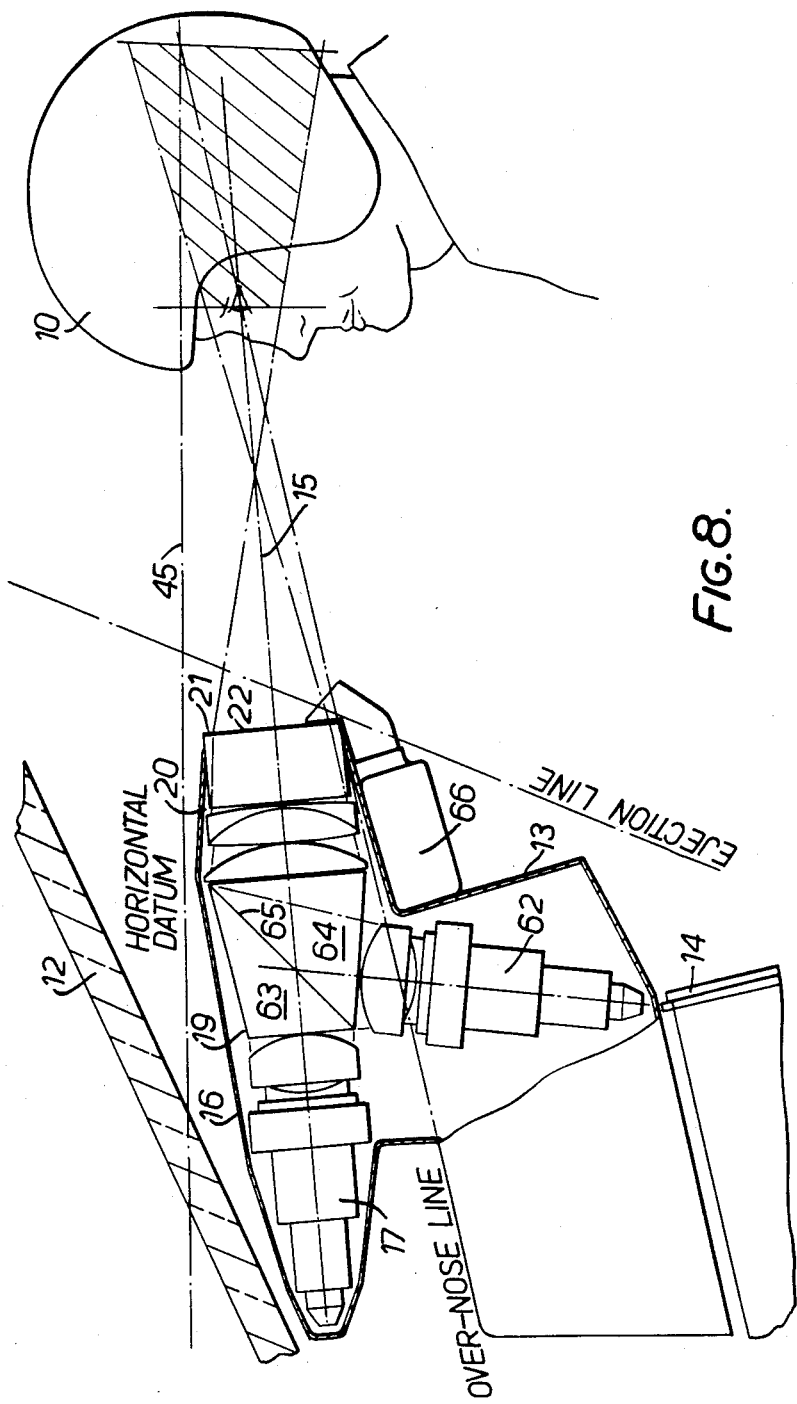
FIG. 8 shows diagrammatically and in side elevation the arrangement of the various parts constituting a third modified form of the display unit shown in the FIGS. 1 to 3 with the casing of the display unit omitted.

Such a modified two colour display unit is shown in the FIG. 8, where the second cathode ray tube is shown at 62, the two prisms at 63, 64 and the dichroic layer at 65. This Figure also shows how a camera unit 66 may be attached to the display unit so as to photograph the whole or some preferred part of the composite view presented to the pilot at the rear face 22 of the prism assembly 21.

This modified unit has a sectional plan view along the longitudinal optical axis which is generally similar to that shown in the FIG. 2.

The design of the prismatic assemblies referred to above is based on various considerations which will now be explained with reference to FIGS. 4 to 6 and 9 to 11. In the FIGS. 4 to 6 the pilot's eyes are represented by the dots $E_R$ and $E_L$, the subscripts R and L denoting respectively the right and left hand sides of the pilot. Furthermore, the inner reflective-transmissive faces at 28, 31 and 29, 32 are referred to as $I_R$ and $I_L$ respectively, and the outer reflective faces at 35 and 38 are referred to as $O_R$ and $O_L$ respectively.

As in the case of FIG. 1 allowance for a reasonable range of normal transverse head movement on the part of the pilot must be allowed for, so that the pilot can have a desired forward view no matter where his head may be within a predetermined range of positions.

The pilot may for example wish to move his head to one side or the other so as to see some part of the display of luminous signals which is not within his field of vision when his head is in the central position. Thus the prism system must be such as to prevent the pilot's view being interrupted by the casing 16 even when his head is displaced sideways within the said range. The said range is indicated by the limiting positions of the right and left eyes indicated at $E_{RL}$ and $E_{LL}$. Hence, in FIG. 4 the aforesaid zone of permitted head motion is represented by the shaded rectangle which is bounded at front and rear by the planes containing the operational and design eye positions.

In looking ahead at the distant scene from the normal (central) eye positions $E_R$ and $E_L$ the pilot's eyes will see at the inner reflecting faces $I_R$, $I_L$, by virtue of reflection from the outer faces $O_R$, $O_L$, scenes in the respective hidden fields $F_R$ and $F_L$ which lie directly behind and are obscured by the inner faces $I_R$, $I_L$. The boundaries defining the actual fields of view $F'_R$ and $F'_L$ are almost parallel with those of the fields $F_R$ and $F_L$ by virtue of the relatively small lateral shift of the light rays resulting from the double reflection at the parallel reflecting surfaces (a shift of a new centimetres in relation to light travelling from objects some kilometers away).

Further, the eyes may also perceive at the same time light passing through the prism assembly 21 without reflection. Objects seen by virtue of such light appear in proper spatial relation with respect to objects which are seen within the fields $F_R$, $F_L$ by virtue of the double reflection at the parallel reflecting surfaces. Transverse movement of the head to one side of the longitudinal optical axis 15 enables a shifting field of view to be seen, progressively more of which is seen by one eye by direct vision through the prism assembly and progressively less by virtue of double reflection, and vice versa for the other eye.

As each eye transfers its gaze across the common rear edge 30 of the two inner reflecting faces $I_R$, $I_L$ that eye cannot perceive the casing 16 on either of those faces, and the eyes are unaware of that edge as they scan the rear surface of the prism assembly, looking at the distant scene.

Though at any instant each eye may perceive (a) light rays transmitted directly through the prism 33 or 34 ahead, (b) light rays transmitted by reflection at one pair of parallel faces, (e.g. $I_R$, $O_R$) and (c) light rays transmitted by reflection at the other pair of parallel faces (e.g. $I_L$, $O_L$) the pilot is aware only of an accurate reconstruction of the scene ahead of him, even though parts of that scene are hidden from his direct view.

As the pilot moves his head to one side or the other of the longitudinally optical axis 15, or scans his eyes horizontally, the scene appearing within his view changes in true manner as though the display unit were not obstructing his view.

Figure 5:
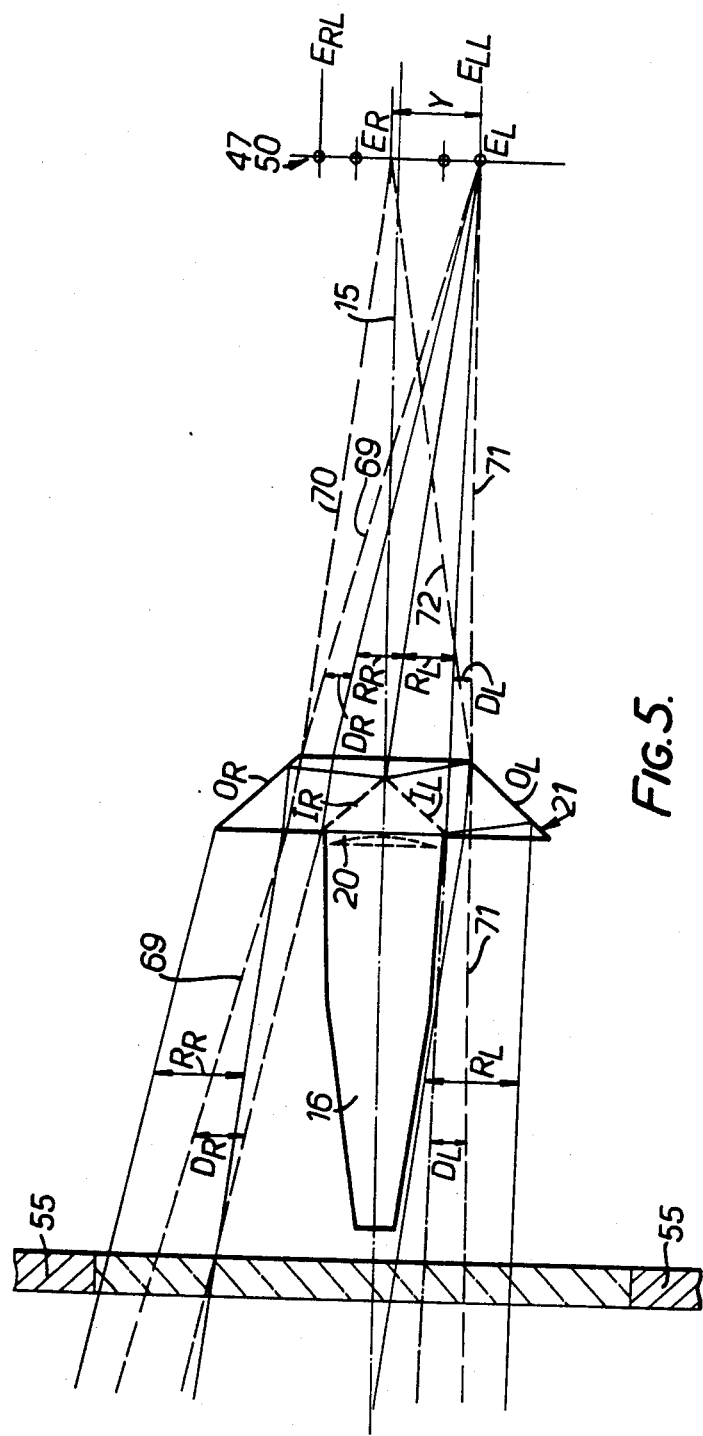
FIG. 5 shows a further simplified diagrammatic plan view of the modified display unit shown in the FIG. 4, but having indicated thereon the paths of various other light rays passing to the pilot's eyes.

In the FIG. 5 various fields of view of the left hand eye $E_L$ when in the extreme position $E_{LL}$ are indicated at $D_L$, $R_L$, $R_R$, $D_R$. Thus in scanning that eye horizontally from left to right, the direct view $D_L$ is scanned first, followed in succession by the reflected view $R_L$, the reflected view $R_R$, and the direct view $D_R$.

It will be appreciated that when scanning the eyes from right to left, until the left eye $E_L$ reaches the extreme right hand limit 69 of its vision, the right eye is 'blind' (so far as vision through the prism assembly 21 is concerned) until it is aligned to perceive the light ray 70, so that within this range of scanning the pilot's vision results solely from the light perceived by the left eye $E_L$.

As the scanning process continues, both eyes perceive light via the prism assembly 21, and so contribute jointly to the pilot's vision. This continues until the left eye loses sight of the limiting rays 71, whereafter this eye becomes 'blind' (so far as vision through the prism assembly 21 is concerned) for the rest of the scan. The scan ceases when the right eye $E_R$ loses sight of the limiting ray 72, whereafter the pilot receives no vision of the scene ahead through the prism assembly 21.

Figures 9, 10:
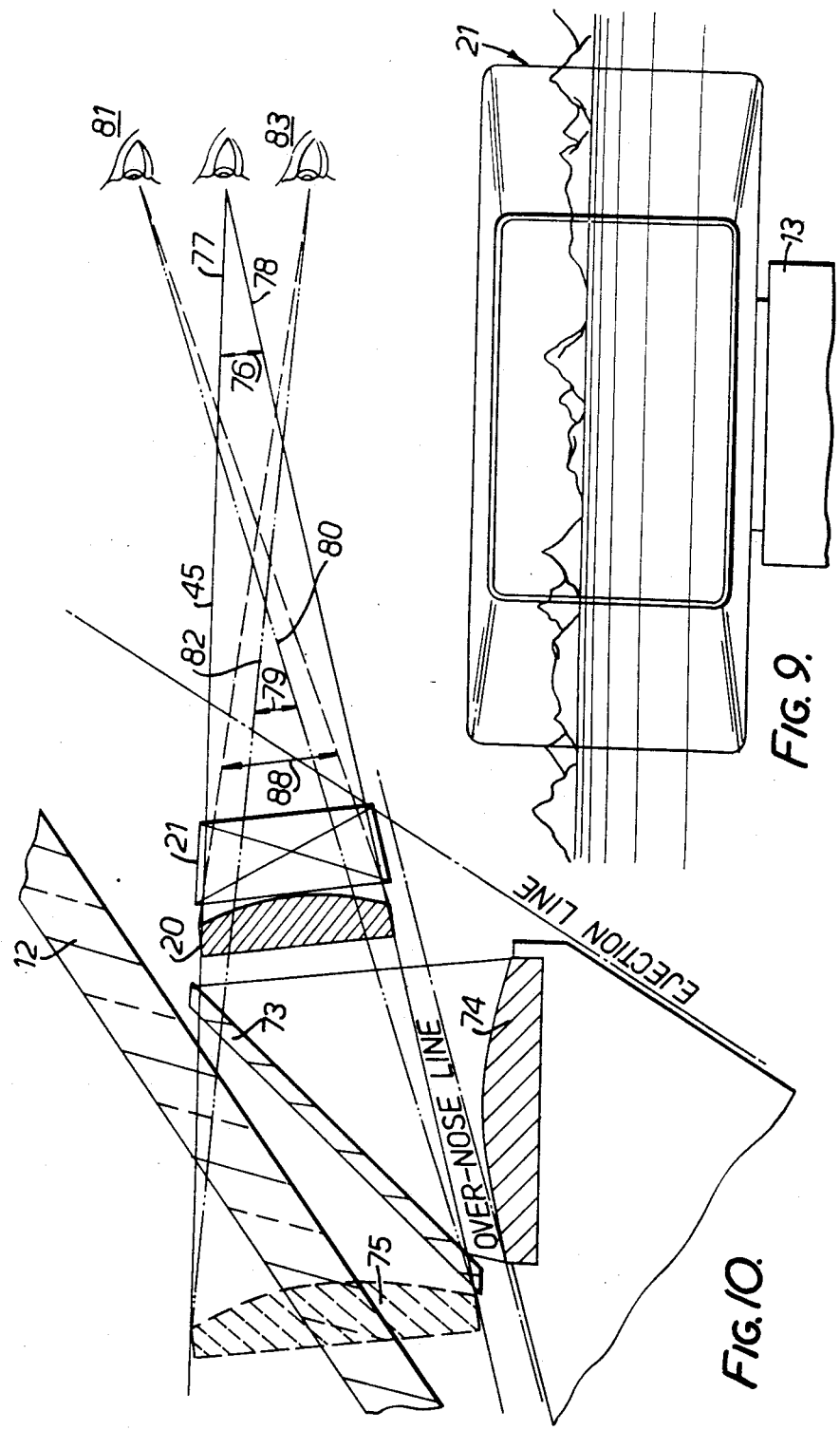
FIG. 9 shows a pilot's view of a typical scene ahead of an aircraft when in normal horizontal flight, with the outline of the display unit of FIGS. 4 and 5 indicated thereon.
FIG. 10 shows diagrammatically and in side elevation the relative dispositions of various equivalent parts in a typical prior art head-up display unit and in the head-up display unit represented in the FIGS. 4 and 5.

FIG. 9 depicts against a representation of a mountainous scene ahead of an aircraft the outline of the prism assembly 21 of the headup display unit. Though the pilot when looking at the outline of the prism assembly as such will see the outline thereof as depicted, when scanning the horizon through the prism assembly with his eyes focussed 'at infinity', he will perceive the mountainous scene ahead as portrayed, substantially as if the outline of the prism assembly did not exist. Furthermore, if a distant aeroplane flying over the mountains were to traverse the flight path of his aircraft, the pilot could follow, without interruption of his view, the flight of the aeroplane as it passes across his horizon.

Thus the design of the prism assemblies 21 referred to above is accomplished in the following way.

With the determination of a given cockpit configuration and a suitable assembly of cathode ray tube 17 and collimating optical system 19 the principal parameter values concerned with the design of the prism assembly are already settled; namely, the zone of permitted head motion of the pilot, the distance of that zone from the porthole 20 of the optical system 19, and the position of the windshield frame 55. Hence in the FIG. 6 the values of the dimension D (outside diameter of casing 16 around the porthole 20. L (distance of the front face 23 of the prism assembly from the eye), X (maximum transverse displacement of the eye $E_L$ from the longitudinal optical axis 15), and $\mu$ (the refractive index of the prism glass to be used) are all predetermined. Furthermore, the prism assembly is to be symmetrical about the longitudinal optical axis 15.

The free front face 27 of the central triangular prism 26 is given a width just greater than D.

The limiting ray passing along the path 93 and reflected at the front edges of the inner and outer faces $I_R$ and $O_R$ determines the inclination of those faces relative to the free face 27, since the respective angles of incidence of the path at the two points of reflection are equal to the respective angles of reflection. This completely determines the dimensions and angles of the central prism 26, since the point 30 of intersection of the two inner faces $I_R$ and $I_L$ lies on the longitudinal optical axis 15, and the spacing of the outer faces $O_R$ and $O_L$ from the respective faces $I_R$ and $I_L$.

The position of the rear plane face 22 of the prism assembly is then determined by the path 94 of the limiting ray which just skirts the side of the casing 16 (in which the cathode ray tube and collimating optical system are enclosed) and which is seen just as the eye $E_L$ scans the edge of the inner face $I_L$ which meets with the adjacent edge of the inner face $I_R$. The point of reflection of this ray on the outer face $O_L$ determines the position of the intersection of the rear face 22 with the outer faces $O_L$ and $O_R$.

Figure 7:
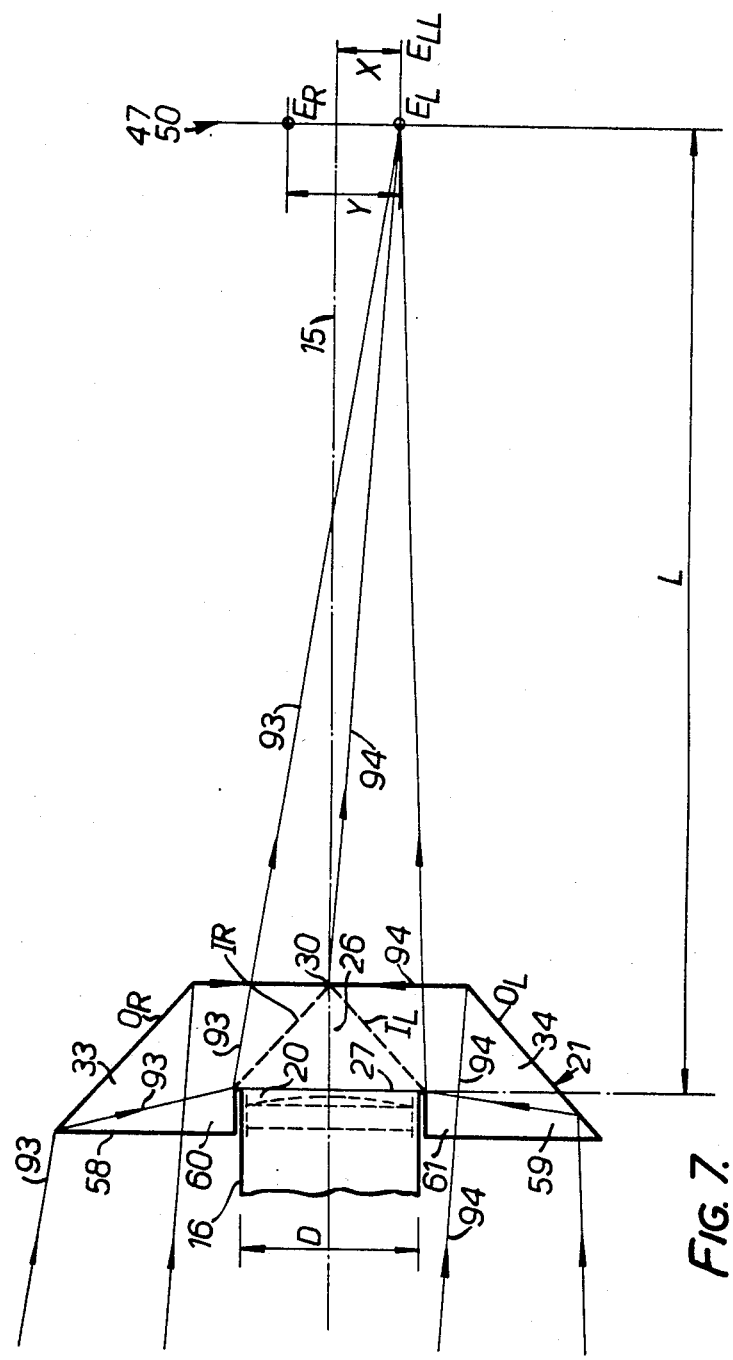
FIG. 7 shows a simplified diagrammatic plan view of a superposing (or combining) optical system incorporated in a second modified form of the unit shown in the FIGS. 1 to 3, in which view the paths of various light rays passing to the pilot's eyes are shown.

Similar considerations apply in respect of the prism assembly shown in the FIG. 7.

In accordance with the normal practice the collimating optical unit 19 provides a virtual image of the circular screen 18 of the cathode ray tube 17, which image appears to the pilot as if it is an infinite distance, and which image subtends at the pilot's eye a cone angle of for example 20°. Since there is a severe lack of space in front of the pilot it is not possible to provide in front of him a porthole 20 which is great enough to encompass the whole of the 20° cone necessary for an instantaneous vision of the whole of the image of the cathode ray tube screen. Therefore, a similar instantaneous field of view, as given by a smaller porthole, has to be accepted. Thus, the pilot is required to move his head from position to position so as to scan different fields of the screen image as he requires to see different pieces of information displayed at those parts.

The nearer the porthole is to the pilot, the greater is the instantaneous field of the screen image that he can see.

In the present case the porthole is situated at the minimum possible distance from the aforesaid zone of acceptable pilot eye positions, so that the instantaneous field of view of the screen in relation to the size of the porthole is substantially greater than that in prior art HUD display units. Thus the amount of movement of the pilot's head to gain a total view of the screen image is greatly reduced.

Figure 11:
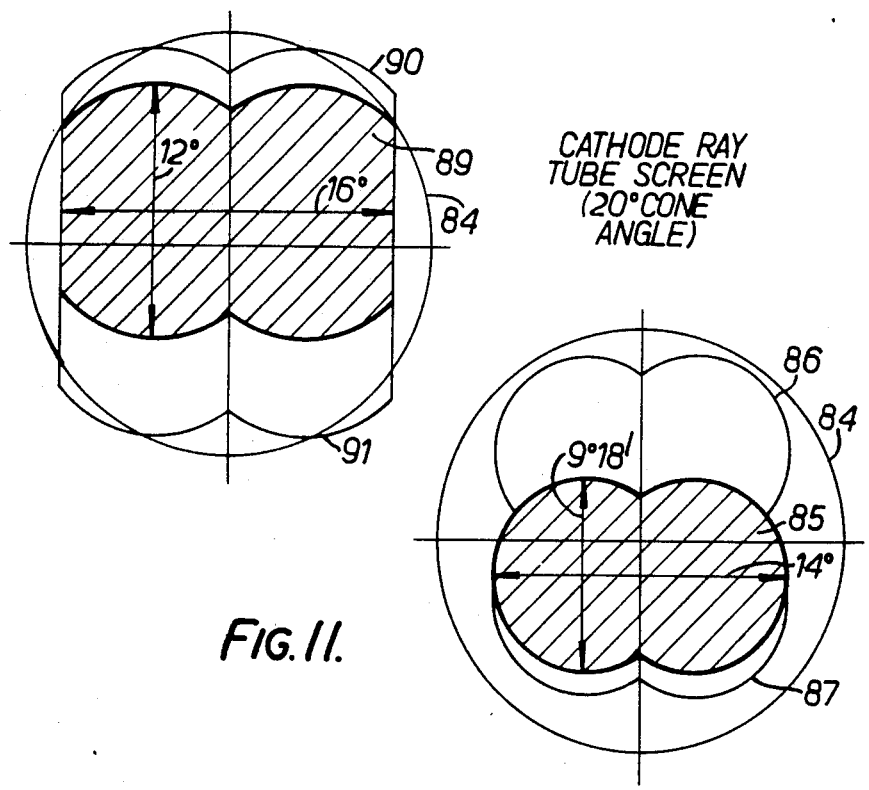
FIG. 11 shows diagrammatically representations of the pilot's instantaneous and other fields of view in the respective head-up display units represented in the FIG. 10.

This is illustrated in the FIGS. 10 and 11.

In FIG. 10 there is shown to the rear of the windshield 12 a conventional combiner screen 73 and collimator porthole optic 74 of a typical prior art head-up display unit. The virtual position of the porthole optic (lens) is shown in dotted lines at 75, and the instantaneous field of view of this at the design eye position shown is designated by the arrow 76 extending between upper and lower boundary lines 77, 78.

The total field of view available to the eye by upward and downward movement respectively is designated by the arrow 79 extending between the lower boundary line 80 of the high eye position 81 and the upper boundary line 82 of the low eye position 83.

In FIG. 11, the various fields of view obtainable with such a typical prior art arrangement are indicated in the right hand figure, where the perimeter of the 20° cone-angle collimated image of the cathode ray tube screen 18 is shown by the circle 84. The shaded area 85 represents the instantaneous field of view corresponding to the size of the angle 76 in FIG. 10 at the design eye position.

Dropping the eyes 2½ in. below the design eye position raises the instantaneous field of view to an upper position in which its upper boundary lies at 86, whilst raising the eyes ½ inch above the design eye position drops the instantaneous field of view to a lower position at which its lower boundary lies at 87. Thus a vertical change in eye position of 3 inches produces a total observable field of view lying between the upper and lower boundaries shown at 86 and 87. These fields of view are obtainable with a 5 inches diameter porthole optic.

By way of comparison, there is shown in FIG. 10 the porthole optic 20 and prism assembly 21 of a head up display unit based on the arrangement shown in the FIGS. 4, 5, the porthole optic 20 being of such diameter as to subtend the same cone angle 76 of instantaneous field of view at the pilot's eye.

It will be observed that since the porthole optic 20 is much nearer the pilot's eye, the angle of the total field of view that can be observed by movement of the eye between the positions 81 and 83 is that indicated by the arrow 88. It will also be observed that this angle 88 is much greater than the corresponding angle 79, despite the fact that the porthole optic 20 is much smaller than the optic 74 of the prior art display unit.

Thus for a porthole optic 20 of diameter greater than that indicated in FIG. 10 a much greater instantaneous field of view is obtainable, so that still less vertical movement of the eye is required to cover the total vertical extent of the cathode ray tube screen image. This is demonstrated in the left hand figure of FIG. 11, where the various fields of view shown are applicable to a porthole optic of 4 inches diameter and which has been trimmed at its sides so as to have a width between parallel vertical side edges of 2¾ inches.

The instantaneous field of view at the design eye position is shown by the shaded area 89. Dropping the eyes ½ inch below the design eye position raises the instantaneous field of view to a position in which its upper boundary lies at 90, whilst raising the eyes by 1½ inches below the design eye position drops the instantaneous field of view to a lower position at which its lower boundary lies at 91. Thus a vertical change in the eye position of 2 inches produces a total observable field of view lying between the upper and lower boundaries shown at 90 and 91.

Thus with a porthole optic substantially smaller than that of the prior art unit, the display unit according to the present invention offers a substantially greater observable field of view with substantially less vertical movement of the eye.

Figure 12:
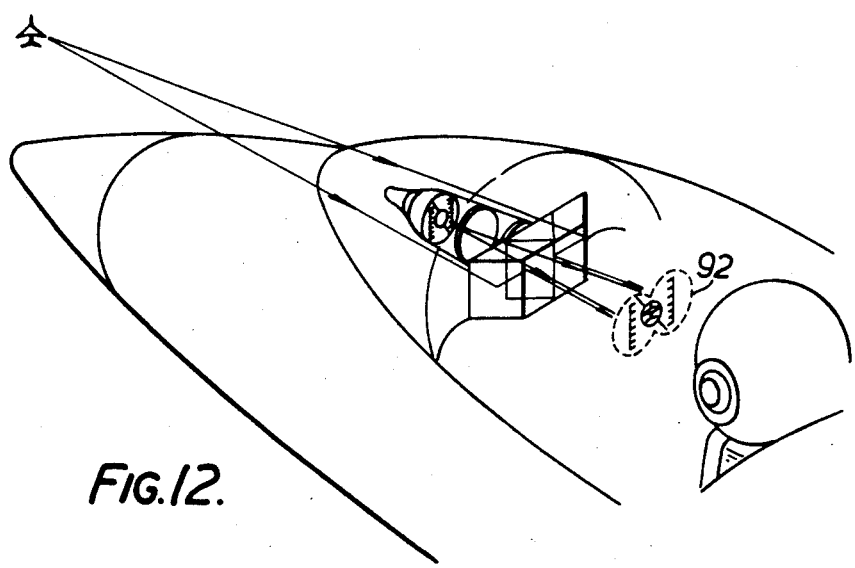
FIG. 12 shows pictorially a pilot seated in his aircraft and viewing the scene ahead of the aircraft through a head-up display unit as represented in the FIGS. 4 and 5.

FIG. 12 shows pictorially the pilot seated in the aircraft cockpit and observing the scene ahead. Flying across that scene is an aeroplane, and the cathode ray tube screen carries a display in the form of a pair of vertical side scales and between them a line interrupted by a circle. A representation of what the pilot sees when looking into the display unit prism assembly 21 is shown at 92.

Figure 6:
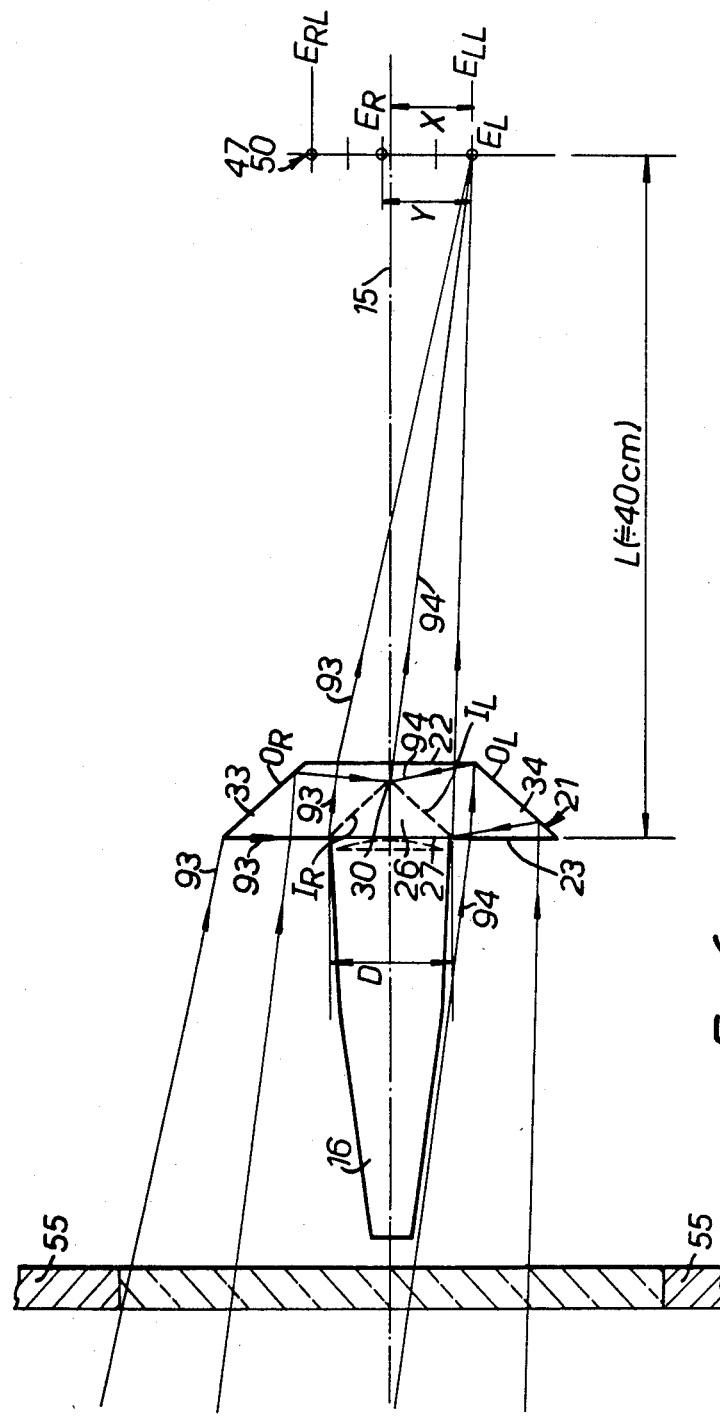
FIG. 6 shows a plan view similar to that of the FIG. 4, but having indicated thereon the paths of different light rays passing to the pilot's eye.
Figure 13:
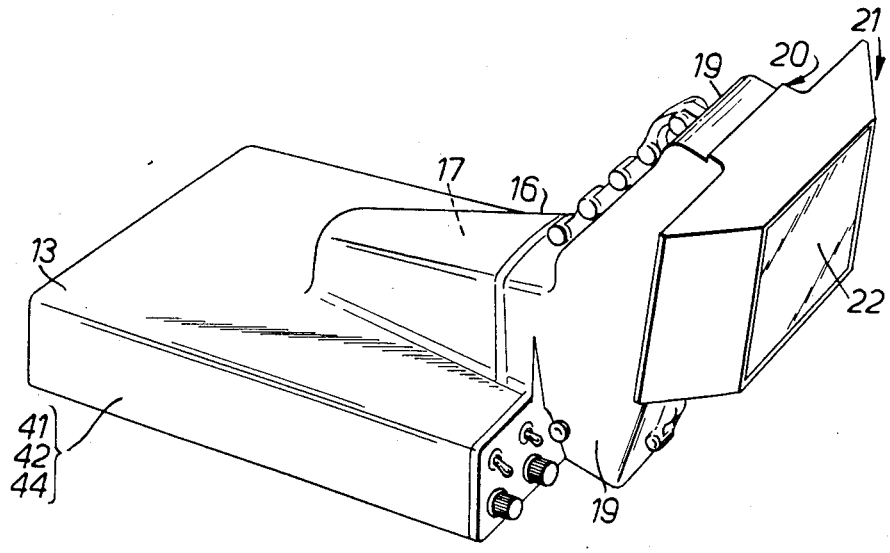
FIG. 13 shows pictorially one head-up display unit as represented in the FIGS. 4 and 5.

FIG. 13 shows pictorially one practical embodiment of a head-up display unit using the arrangement shown in the FIGS. 4 to 6. In this embodiment, however, the cathode ray tube is disposed on an axis which is parallel with and below the longitudinal optical axis 15, and the luminous signals produced on the screen 18 of the cathode ray tube are reflected by an arrangement of prisms in the collimating optical unit so as to be visible through the porthole 20 which is situated directly adjacent the central prism of the prism assembly 21. Whereas the prism assembly has a width (measured normal to the vertical longitudinal central plane) of some 23 cm, the collimating unit adjacent that assembly has a width of some 7½ cm. Beneath the cathode ray tube, the housing 16 enclosing the associated electrical apparatus has a width of some 18 cm. This display unit has an approximate weight of some 10 kilograms, which is one half or less of the weight of comparable prior art display units.

By dropping the cathode ray tube 17 below the longitudinal optical axis 15 as in the arrangement of FIG. 13, or as in an arrangement similar to that of the FIG. 8 but having the cathode ray tube 62 only, the forward length of the view-obstructing part of the casing 16 is greatly reduced, so that a more advantageous design of prism assembly 21 and a better field of view of the scene ahead is possible.

Figure 14:
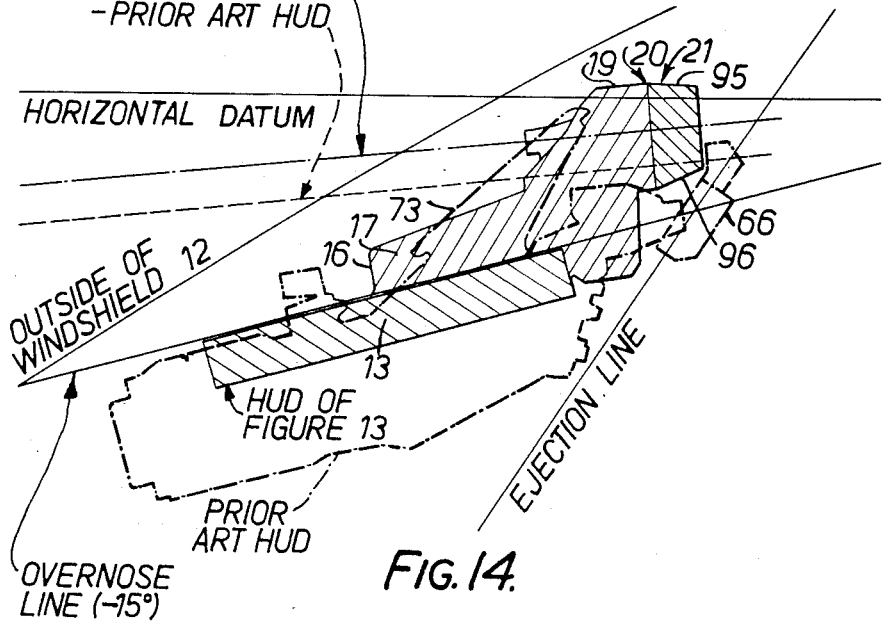
FIG. 14 shows the comparative outlines, seen in side elevation, of a typical prior art head-up display unit and of the head-up display unit represented in the FIG. 13.

FIG. 14 shows in comparison with one another the outlines, in side view, of the unit shown in the FIG. 13 and of a typical and comparable conventional prior art head-up display unit. It will be observed that the unit of FIG. 13 occupies considerably less space below the level of the porthole 20.

In the various prism assemblies 21 referred to in the above description the inner optical faces $I_R$, $I_L$ may be so arranged that in each such face only a central part thereof through which signals visible at the porthole are to be observed in rendered capable of transmitting light from the porthole and from the adjacent outer optical face, boundary areas of that face which adjoin the central part being made fully reflecting to light received from the adjacent outer optical face.

In designing the various prism assemblies 21 described earlier, the faces which have to transmit light from the porthole and reflect light from an adjacent outer optical face are made approximately 15 to 20 per cent transmissive and 80 to 65 per cent reflective.

It will be appreciated that though in discussing FIG. 11 no mention has been made of the effect of sideways movement of the pilot's head, such movement shifts the respective shaded area sideways. Such sideways movement of the head does not present the designer of display units with problems as difficult to solve as those which arise in accommodating vertical movement of the pilot's head.

Though in general the various head-up display units described are concerned with observing a distant scene ahead of the pilot, so that the outer optical faces $O_R$, $O_L$ are to all intents and purposes parallel with the inner optical faces $I_R$, $I_L$, if in another field of application such a head-up display unit is intended to give the observer a view of a nearer scene ahead the outer optical faces $O_R$, $O_L$ are rotated inwardly through an appropriate small angle so that they are not longer exactly parallel with the inner optical faces $I_R$, $I_L$, and so that a reflected ray seen by the observer at the edge of an inner optical face disposed adjacent the porthole originates from a point in the scene ahead which lies immediately adjacent a point in that scene which is seen by the observer directly through the prism at a point immediately adjacent that edge. For example, to observe a scene approximately 7 meters ahead the outer optical faces must be rotated inwardly by approximately one half degree.

The design of the various prism assemblies 21 described above may be varied to suit a particular application by varying the refractive index $\mu$ of the glass used for the prisms. Furthermore, the inclination of the outer optical surfaces $O_R$, $O_L$ may be varied slightly to compensate for the optical properties of the particular windshield 12.

In preferred form of the various prism assemblies 21 the upper and lower faces 24, 25, at which the inner and outer optical faces $I_R$, $I_L$ and $O_R$, $O_L$ terminate, are made divergent in the direction of the porthole 20 (i.e. convergent towards the pilot's eyes) so as to present less obstruction of the pilot's view when his gaze crosses the upper and lower boundaries of his field of view through the prism assembly. This preferred feature is illustrated in the FIG. 14 at 95 and 96.

Though in the various display units described above the luminous signal source has been constituted by the screen of a cathode ray tube, other forms of luminous signal source may be used instead, e.g. liquid crystal sources; luminous diode sources; illuminated graticules, and laser and holographic devices. Furthermore, static signal sources (i.e. in which the signals displayed are constant) may be used either alone or in conjunction with a dynamic signal source (e.g. a cathode ray tube). For example, a static signal source (e.g. an illuminated graticule) may replace the second cathode ray tube 62 in the FIG. 8.

In general, head-up display units are intended to provide for the pilot or other observer a display of luminous signals which appears to his eyes as if at the same or a similar distance as the scene which he wishes to observe ahead of him, so that in moving his gaze to observe the display he does not have to change the focus of his eyes.

The collimating optical unit is therefore intended to provide such a display of luminous signals.

Thus, if a head-up display unit is intended to be used in a simulator where the scene ahead lies at a distance of, say, only seven meters (as referred to above), the collimating optical unit is intended to produce a collimated image of the display of luminous signals, which image appears to the observer's eyes at a distance of only seven meters. Thus, in this specification the term 'collimating optical unit' is to be construed as an optical unit for producing for an observer looking into the porthole of the unit a virtual image which appears at a distance beyond the porthole and which is large compared with the diameter of the porthole.

Though the various head-up display units described above all incorporate collimating optical units, other head-up display units generally similar to those described above but not incorporating a collimating signal unit may be used in appropriate circumstances where the need to avoid a change in the focus of the observer's eyes when looking at the display of luminous signals is not so important. In such a modified unit the luminous signal source may be disposed adjacent the free surface 27 of the central triangular prism 26, i.e. adjacent the inner optical faces $I_R$, $I_L$. The luminous signal source may in such a case comprise, for example, the luminous dial of a stop watch.

Though in the above description the head-up display units and systems have been described in relation to their use by a pilot in an aircraft, similar head-up display units may be used by other 'observers' present in an aircraft at other positions.

Furthermore, such head-up display units may be used in other contexts, for example in a military tank, or in a naval vessel, where a display of luminous signals is required to be shown in superposed relationship with a view of a scene lying ahead or of a scene outside an enclosure in which an observer is present.

Though in the various head-up display units described above the plane optical faces $I_R$, $I_L$ and $O_R$, $O_L$ have been provided on supporting means constituted by glass prisms, in other forms of head-up display units which are generally similar, those faces are provided with other forms of supporting means, e.g. plane plates of glass (silvered and partly silvered as appropriate). However, supporting means in the form of glass prisms are preferred since they provide a more robust, stable and accurate form of supporting means. Furthermore the glass prisms shorten the optical paths of the light rays passing to the observer's eye.

I claim:

1. A head-up display unit for use for example in an aircraft including
   a luminous data signal producing means for producing collimated luminous data signals,
   combining means for receiving light rays from said signal producing means and for combining them with light rays received from a distant scene which is to be observed at a predetermined observation position whereby to enable the said scene and data signals to be observed at the said observation position in superposed relationship,
   characterised in that
   at least a part of the said signal producing means is disposed between the said observation position and the said scene and hence obscures direct observation of at least a part of the said scene as viewed from the said observation position, and
   the combining means is disposed between the said signal producing means and the said observation position and includes optical means having light transmissive and light reflective properties for producing at the said observation position an image of the said scene ahead as viewed from a position spaced transversely of the said signal producing means and an image of the said luminous data signals, one of those images being produced by virtue of the said reflective properties of the optical means and the other of those images being produced by virtue of the said transmissive properties of the optical means.

2. A head-up display unit according to claim 1, wherein the said optical means produces at the said observation position images of the said scene ahead as viewed from separate positions spaced transversely apart on opposite sides of the said signal producing means, as well as the image of the said luminous data signals, the respective images of the said scene ahead being produced by virtue of the same type of optical properties of the said optical means.

3. A head-up display unit according to claim 1 characterized in that the luminous data signal producing means includes a source of luminous signals, and a collimating optical unit having a part defining an input aperture disposed adjacent the luminous signal source and a part defining an output aperture or porthole through which a virtual image of the luminous signal source is visible, which image subtends at the eye of an observer, when looking at the porthole from a predetermined eye position, a predetermined angle that is greater than the angle subtended by the porthole at the observer's eye, and that at least the porthole part of the collimating optical unit is disposed between the said observation position and the said scene ahead of the observer whereby part of the observer's view of that scene by direct vision is obscured, and that the combining means is disposed between the porthole part of the collimating optical unit and the said observation position, and comprises means for transmitting to the observer's eye a view of the porthole by direct transmission of light from the porthole and a view of the said scene ahead by reflection of light from the said scene.

4. A head-up display unit according to claim 3, wherein the combining means includes at least one first plane optical face disposed adjacent the porthole and inclined at an angle thereto, and at least one second plane optical face disposed substantially parallel to but spaced from the first optical face, the first optical face being capable of transmitting light from the porthole to an observer at the observation position and of reflecting to the observer light received from the scene ahead by virtue of reflection at the second optical face.

5. A head-up display unit according to claim 3, wherein the combining means includes two mutually-inclined plane optical faces (referred to hereafter as the inner optical faces) which adjoin one another at a common edge disposed remote from the said porthole part, which inner optical faces diverge in the direction of and jointly span the said porthole part, and two further plane optical faces (referred to hereafter as the outer optical faces) which are disposed substantially parallel with and spaced from the respective inner optical faces, the inner optical faces being capable of transmitting light from the porthole to an observer at the observation position and of reflecting to the observer light received from the scene ahead by virtue of reflection at the outer optical faces.

6. A head-up display unit according to claim 5, wherein the inner and outer optical faces have edges which lie in a common plane adjacent the porthole part.

7. A head-up display unit according to claim 3, wherein the said common edge of the inner optical faces is positioned centrally relative to the part of the collimating optical unit which obscures the observer's direct vision of the scene ahead; the inclination and length of each inner optical face, and the inclination and spacing of each outer optical face relative to the adjacent inner optical face, are determined by the path of a predetermined boundary ray of light which passes from a predetermined extremity of the scene ahead on one side thereof and which is seen by an observer's eye positioned at a predetermined limiting eye position on the opposite side of a central plane which passes through the said common edge of the inner optical faces and through the center of the said porthole part and of the scene ahead, after reflection at the respective edges of the inner and outer optical faces which lie nearest the said porthole part on the same side of the central plane as the said extremity; and the length of each outer optical face being determined by the path of a limiting ray of light from the scene ahead, which ray skirts the said vision-obscuring part of the collimating optical unit on the same side of the central plane as the said predetermined limiting eye position, and which is seen by the observer's eye at that position after reflection at the respective edges of the outer and inner optical faces which lie furthest from the said porthole part on the same side of the central plane as the said limiting eye position.

8. A head-up display unit according to claim 5, wherein each inner optical face has a central area which is capable of transmitting light to the observer directly from the porthole and by reflection from the adjacent outer optical face, and boundary areas which adjoin the central area and which are capable of transmitting light to the observer only by reflection from the adjacent outer optical face.

9. A head-up display unit according to claim 5, wherein inner and outer optical faces which lie adjacent one another are constituted by opposite, substantially parallel faces of a glass prism, and wherein a third glass prism of triangular shape has two similar plane faces cemented to the respective faces of the respective prisms which constitute the said inner optical faces, the cemented pairs of faces of the third prism being such as to provide the aforesaid light transmitting and reflecting properties, and the three prisms being of a glass material having predetermined optical properties.

10. A head-up display unit according to claim 9, wherein the two prism faces nearest the said observation position and through which the observer may perceive the scene ahead and the luminous signals are disposed in a common plane which is parallel with the plane of the porthole.

11. A head-up display unit according to claim 9, wherein each prism face constituting one of the said outer optical faces has cemented thereto a plane face of a glass prism of triangular shape, whereby to provide an assembly of five prisms in which the cemented faces which constitute the outer optical faces are arranged to be capable of transmitting light from the scene ahead directly to the observer, and by reflection to the adjacent inner optical face, the respective prism faces of the assembly which are nearest the said observation position being disposed in a common plane which is parallel with the plane of the porthole and the outer triangular prism being of a glass material having the said predetermined properties.

12. A head-up display unit according to claim 9, wherein the two similar faces of the central triangular prism are treated before being cemented to adjacent faces of adjacent prisms so as to render them capable of transmitting light from the porthole and of reflecting light from the adjacent outer optical face, and wherein each of the said adjacent faces of the said adjacent prisms is similarly treated as aforesaid only at a central area, and is treated at boundary areas adjoining the central arm so as to render the boundary areas only capable of reflecting light from the adjacent outer optical face.

13. A head-up display unit according to claim 9, wherein in the assembly of prisms the inner and outer optical faces terminate at plane transverse faces which diverge in the direction of the porthole.

14. A head-up display unit according to claim 4, wherein the plane optical faces are constituted by surface areas on plates of glass, which areas have been treated to give them the required optical properties, the plates of glass being rigidly carried in a supporting means.

15. A head-up display unit according to claim 3, wherein the input aperture of the collimating optical unit is coaxial with the output aperture or porthole.

16. A head-up display unit according to claim 3, wherein the input aperture of the collimating optical unit is offset relative to the output aperture or porthole, and the collimating optical unit includes means for reflecting rays of light from the luminous signal source to the porthole whereby to render luminous signals of the said source visible through the porthole.

17. A head-up display unit according to claim 15, wherein the collimating optical unit has a second input aperture disposed adjacent a second luminous signal source, and the collimating optical unit includes means for combining rays of light from the respective luminous signal sources whereby to render luminous signals from both sources visible simultaneously through the porthole.

18. A head-up display unit according to claim 3, wherein the, or at least one, luminous source includes electrical energisation means responsive to electrical input signals supplied thereto whereby to provide a luminous signal display which varies in accordance with the input signals.

19. A head-up display unit according to claim 3, wherein the, or at least one, luminous signal source comprises means for producing a static display of luminous signals.

20. A head-up display unit according to claim 18, wherein the, or at least one, luminous signal source comprises a cathode ray tube.

21. A head-up display unit according to claim 3, wherein an output lens mounted at the porthole comprises a lens in the shape of a circle from which opposite edge parts have been removed to provide a pair of parallel boundaries.

22. A head-up display system including a head-up display unit according to claim 18, electrical amplifying means having output circuit means connected to the luminous signal source whereby to supply thereto electrical signals for varying the display of luminous signals, electrical computing means having output circuit means connected to the amplifying means whereby to supply thereto electrical control signals for varying the luminous signals display in accordance with a predetermined function of input signals supplied to input circuit means of the computing means.

23. An aircraft having a head-up display unit according to claim 3 mounted adjacent a windshield.

24. An aircraft having mounted therein a head-up display system according to claim 22.

25. A head-up display unit for use for example in an aircraft or other vehicle comprising
a data source operable to present luminous data signals;
a collimating optical system at least part of which, when the display unit is being carried in or by a vehicle, intercepts the line of sight of the observer to the distant scene forward of the observer and which is effective to project collimated luminous data signals presented by the data source; and,
between an output porthole of the collimating optical system and the observer, first and second partially light-transmissive, partially light-reflective planar films which are so inclined to one another as to define a space in the form of a prism of triangular cross section which spans the porthole and the apical edge of which is remote from the porthole, and through which such luminous data signals as may be projected from the porthole are transmitted to the observer, and third and fourth light reflective planar films parallel to and laterally spaced with respect to the first and second films, respectively; and in which,
the angle of inclination between the first and second films is such, and the dimensions of the four films, and the lateral spacing between the first and third films and the second and fourth films, respectively, are such that certain rays of light from the distant scene forward of the observer and incident on the third film are received by the observer after successive reflections at the third and first films,
in like manner certain rays of light from the distant scene forward of the observer and incident on the fourth film are received by the observer after succession reflections at the fourth and second films, and
light reflected from the said part of the collimating optical system and incident on the third and fourth films, and after reflection therefrom, on the first and second films respectively, is deflected by the first and second films so that, for a certain range of movement of the observer's head in either direction transverse to the forward line of sight of the observer, the said part of the collimating optical system is not visible to the observer.

26. A head-up display unit according to claim 3, wherein the outer optical faces are supported separately from the associated inner optical faces.

27. A head-up display unit which comprises a luminous data source, and between that source and an observer's observation position a beam-splitting periscopic device which is effective to deflect rays from that part of a scene ahead of the luminous data source which in the absence of the periscopic device would be obscured by the luminous data source, in such manner that the said part of the scene ahead is reconstituted at a position between the data source and the observation position, so that an observer at the observation position would have a substantially uninterrupted and undistorted angular field of view of the scene ahead superimposed upon the luminous data transmitted by the periscopic device.

28. An optical device for use by an observer for the purpose of obtaining an unobstructed field of view of a forward distant scene in the presence of an obstruction lying within the aforesaid field of view, which device has first and second light-reflective planar films which are so inclined to one another as to define a space in the form of a prism of triangular-cross-section the base of which has a width not less than the width of the said obstruction; and third and fourth light-reflective planar films parallel to and symmetrically and laterally spaced with respect to the first and second films respectively;

in which device the angle of inclination between the first and second films, the dimensions of the four films, and the lateral spacing between the first and third film and the second and fourth films, respectively, are all such that, when, in use, with the device supported so that the said obstruction is spanned by the first and second planar films certain rays of light from the distant scene forward of the observer and incident on the third film are received by the observer after successive reflections at the third and first films, and in like manner certain rays of light from the distant scene forward of the observer and incident on the fourth film are received by the observer after successive reflections at the fourth and second films; light rays from the distant scene which are reflected by the obstruction and are incident on the third and fourth films and, after reflection therefrom, on the first and second films respectively being deflected by the first and second films so that, for a predetermined range of movement of the observer's head in either direction transverse to the forward line of sight of the observer to the distant scene, the said obstruction is not visible to the observer;

and in which device the transverse distance between the third and fourth films at their edges which are closest to the observer's viewing position is not less than a predetermined inter-pupillary distance of the observer, and for the said range of observer's head movement the width as seen by the observer of each of the third and fourth films is not greater than the said inter-pupillary distance.

29. An optical device comprising a glass prism assembly which includes three prisms of glass material of the same optical properties cemented together, the prisms comprising a. a central prism of triangular transverse cross section defined by two similar, plane, light-outlet faces and a plane, light-inlet face inclined at equal angles to the respective light-outlet faces, and b. two similar outer prisms disposed side to side and symmetrically adjacent the respective light-outlet faces of the central prism, each outer prism having parallel, plane, input and output reflective faces, of which the output reflective face is cemented to the adjacent lightoutlet face of the central prism to form an interface between the respective prisms, at least a central area of the interfaces being partially light-reflective and partially light-transmissive, and plane, light-inlet and light-outlet faces disposed parallel to one another and to the light-inlet face of the central prism so that when in use an observer looking at the adjoining light-outlet faces of the outer prisms observes simultaneously i. a distant scene ahead of the assembly through the light inlet and outlet faces of the respective outer prisms, by virtue of the reflection of light rays from that scene successively at the input and output reflective faces in each other prism, and ii. any bright object disposed immediately ahead of the light inlet face of the central prism by virtue of the direct transmission, without any substantial refraction, of light rays from that object through the said interfaces, so that the observer sees an image of the said scene ahead with an image of the said object superposed thereupon.

30. An optical device according to claim 29, wherein the partially light-reflective and partially light-transmissive central area has adjoining it interface boundary areas which are light-reflective only.

31. An optical device comprising four plane glass plates, and means supporting those plates rigidly in predetermined positions, an inner pair of said plates (hereafter called the inner plates) being disposed in V-formation with their outwardly-facing plane surfaces meeting one another at a common linear edge and carrying thin optical coatings which render those surfaces partially light-transmissive and partially light-reflective, and the plates constituting an outer pair of said plates (hereafter called the outer plates) being respectively disposed symmetrically on either side of the inner pair of plates, each outer plates being disposed parallel with but spaced transversely from the adjacent inner plate, so that when in use an observer looking at the coated outwardlyfacing plane surfaces of the inner plates observes simultaneously a. a distant scene ahead of the assembly of glass plates by virtue of the reflection of light rays from that scene successively at the outer plates and the inner plates and b. any bright object disposed immediately ahead of the inner pair of plates by virtue of the direct transmission of light rays from that object through the inner plates and their optical coatings, so that an observer sees an image of the said scene ahead with an image of the said object superposed thereupon.

32. An optical device comprising two similar periscope-like elements each comprising means defining parallel-disposed, spaced, planar, light reflective, 'light input' and 'light output' optical faces, the two elements being arranged in reverse relationship relative to one another on either side of a central plane of symmetry, with the respective light input faces spaced transversely apart on either side of the said plane, and with the respective light output faces adjoining one another at a common linear edge which lies in the said plane, and supporting means for the said optical face defining means, the supporting means being arranged so that each eye of an observer looking at the light output faces whereby to observe through the device a distant scene lying ahead of the device in the direction of the said plane can see, and scan from side to side without interruption, both light output faces.

33. An optical device according to claim 32, wherein the said light output optical faces carry thin optical coatings which render those optical faces partially light-transmissive as well as light-reflective, so that in use an observer looking at the light output faces whereby to observe the said scene ahead through the device sees superposed upon an image of the said scene ahead an image of any bright object which is disposed immediately ahead of the light output faces.

34. An optical device according to claim 32, wherein the light input and light output faces of each periscope-like element are constituted by opposite, substantially parallel faces of a glass prism, and wherein a third prism of triangular shape has two similar plane faces cemented to the respective faces of the respective prisms which constitute the said light output faces.

35. An optical device according to claim 34, wherein the cemented faces of the respective prisms are partly lighttransmissive so that an observer looking at the said light output faces whereby to observe the said scene ahead through the device sees superposed upon an image of the said scene ahead an image of any bright object which is disposed immediately ahead of the said third prism.

36. An optical device according to claim 32, wherein the transverse distance between the edges of the light input faces which lie closest to a said observer is not less than a predetermined inter-pupillary distance of said observer, and for a predetermined range of movement of the observer's head in either direction transverse to the forward line of sight of said observer to the distant scene ahead, the transverse width of each of the light input faces, as seen by said observer, is not greater than the said inter-pupillary distance.

37. A head-up display unit according to claim 5, wherein the plane optical faces are constituted by surface areas on plates of glass, which areas have been treated to give them the required optical properties, the plates of glass being rigidly carried in a supporting means.

38. A head-up display unit according to claim 5, wherein the input aperture of the collimating optical unit is offset relative to the output aperture or porthole, and the collimating optical unit includes means for reflecting rays of light from the luminous signal source to the porthole whereby to render luminous signals of the said source visible through the porthole.

39. A head-up display according to claim 9, wherein the input aperture of the collimating optical unit is offset relative to the output aperture or porthole, and the collimating optical unit includes means for reflecting rays of light from the luminous signal source to the porthole whereby to render luminous signals of the said sources visible through the porthole.

* * * * *